United States Patent [19]
Tengler et al.

[11] 3,977,725
[45] Aug. 31, 1976

[54] FORE AND AFT ADJUSTMENT MECHANISM AND SEAT BELT ANCHORAGE FOR SUSPENSION SEAT

[75] Inventors: Harvey N. Tengler, New Berlin; Larry F. Stikeleather, Hales Corners, both of Wis.

[73] Assignee: UOP Inc., Des Plaines, Ill.

[22] Filed: Oct. 24, 1975

[21] Appl. No.: 625,419

[52] U.S. Cl. .............................. 297/385; 248/393; 297/216
[51] Int. Cl.² ........................................ A62B 35/00
[58] Field of Search ........... 248/393, 394, 395, 396, 248/397, 398, 399; 297/216, 385

[56] References Cited
UNITED STATES PATENTS

| 3,463,543 | 8/1969 | Zellar | 297/216 |
| 3,711,153 | 1/1973 | Cunningham | 297/216 |
| 3,727,977 | 4/1973 | Gmeiner | 297/385 X |
| 3,746,393 | 7/1973 | Kölle et al. | 297/385 |
| 3,806,190 | 4/1974 | Winslow | 297/216 |
| 3,811,727 | 5/1974 | Rumpel | 248/393 X |
| 3,845,987 | 11/1974 | Bashford | 248/393 |
| 3,848,937 | 11/1974 | Harder, Jr. | 312/341 NR |

Primary Examiner—James T. McCall
Attorney, Agent, or Firm—James R. Hoatson, Jr.; Barry L. Clark; William H. Page, II

[57] ABSTRACT

Fore and aft adjuster mechanism is capable of serving as the load carrying seat belt anchorage means for a suspension seat having a large amount of vertical travel for isolating the occupant from shocks and vibrations and substantial horizontal travel for adjusting the position of the seat fore and aft to the position most comfortable to a particular occupant. The mechanism insures that the seat belt will remain of the same tautness and angular position relative to the occupant regardless of the amount of fore and aft or vertical movement of the seat. The adjuster mechanism is positioned intermediate the seat base and the vehicle floor and includes a pair of fore and aft guide rails on its sides anchored to the floor and a pair of sliding cross rails anchored to the seat base. Cooperating locking pins on the cross rails and holes in the guide rails provide fore and aft adjustment of the cross rails on the guide rails. The rear cross rail also carries a link on each side which is pivoted at its free outer end to the seat belt attachment point on the seat base. The link allows for unhampered normal vertical and fore and aft movement of the seat while transferring the loading of the seat and occupant to the guide rails and floor in a crash situation.

10 Claims, 4 Drawing Figures

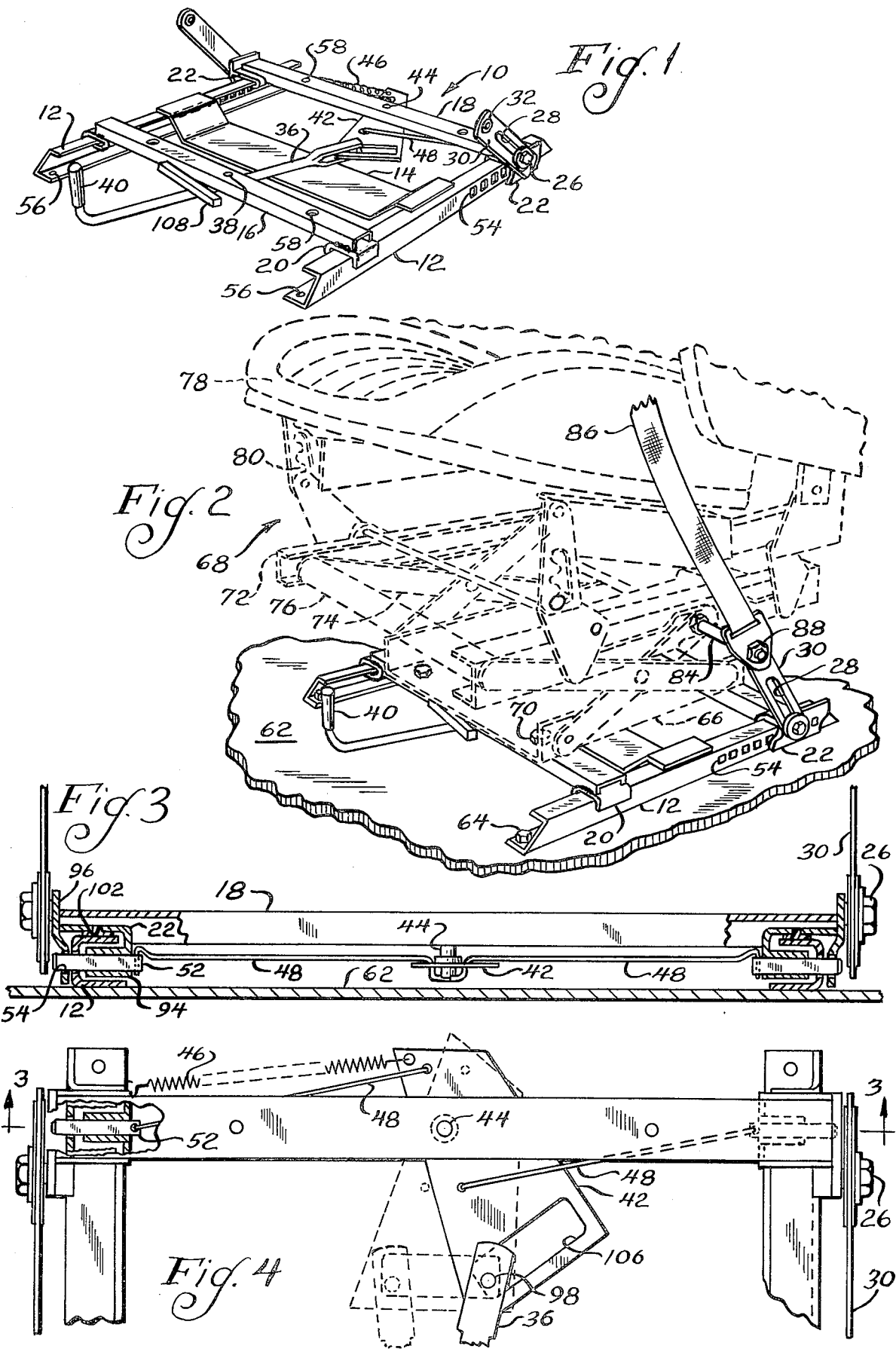

FORE AND AFT ADJUSTMENT MECHANISM AND SEAT BELT ANCHORAGE FOR SUSPENSION SEAT

BACKGROUND OF THE INVENTION

This invention relates to suspension seats and to the providing of such seats with fore and aft adjustments and seat belt anchorages. Although the conventional floor mounting for a seat belt is quite satisfactory for an automobile wherein the seat permits a very limited degree of vertical motion, it is not satisfactory for use with a suspension seat which generally provides 4 or more inches of vertical travel. In suspension seats, it has been common to anchor the lap belt to the movable side frame of the seat and then anchor the movable seat frame to the floor with a tether belt which is adjusted to be taut in the extreme upper position of the suspension. An example of such a mounting can be seen in Barecki et al. U.S. Pat. No. 3,493,211. A problem with the last mentioned type of mounting arises when the seat is of the type having a capability of being adjusted in a fore and aft direction. Since a typical adjustment range for such a seat is about 4 inches, it will be readily appreciated that the movable seat frame to floor tether belt must be sufficiently long to accommodate the entire range of vertical seat movement while the seat is in its extreme forward position. When the seat is in any other fore and aft position, the tether belt will be slack in the uppermost position of the seat suspension and therefore incapable of offering any restraint until after the seat has been damaged by being moved upwardly beyond its upper limit.

Means for overcoming the problems of too much slack in the tether belt are described in Hall et al U.S. Pat. No. 3,737,197 and Radke et al. U.S. Pat. No. 3,758,158 wherein the lap belt and tether belt are connected to a support member which is free to move up and down with the seat but which is restrained from moving horizontally at any vertical position of the seat by being connected to a pivot link means which is connected to the floor and to the support member. The support member includes a guide portion which cooperates with a slide member affixed to the movable seat frame to permit the seat and slide member to move horizontally relative to the guide portion so that the seat can be adjusted fore and aft without affecting the amount of slack in the tether belt. The slide member also transmits the vertical motion of the seat frame and suspension to the guide portion which moves up and down generally vertically. U.S. Pat. 3,811,727 discloses a support system similar to that in the aforementioned Hall et al and Radke et al. patents but which eliminates the separate tether belt by anchoring a pivot link for the support member to the vehicle floor behind the seat. In each of the just mentioned three disclosures the seat belt anchorage is separate from the anchorage for the seat, entailing the additional expense of the time and materials necessary for preparing the vehicle and mounting the separate anchorages to it. Furthermore, in the arrangement shown in U.S. Pat. No. 3,811,727, it is important that the separately mounted seat base and pivot links be accurately installed relative to each other and on properly reinforced portions of the vehicle floor to prevent binding and to insure that the lap belt loads will be adequately supported.

SUMMARY

The fore and aft adjuster mechanism of the present invention overcomes the aforesaid problems with tether belt installations or pivot link mounted separately from the seat by eliminating the need for such separately mounted tether belts or pivot links and consequently the need for the belt anchorage structures described in the above cited patents.

This is accomplished by combining a unique seat mounting arrangement to advantage with a fore and aft adjuster mechanism capable of carrying all lap belt and seat assembly inertial loads directly without the need for conventional supplementary tether belt (or link) attaching means between the lap belt and the vehicle structure.

The fore and aft adjuster mechanism of this invention is comprised of two generally parallel channel sections running fore and aft with respect to the seat. These channels anchor directly to the vehicle by bolts in much the same manner as conventional slide rails. The two parallel channels serve the function of providing the fore and aft guide means for the seat assembly and also contain square holes in their vertical sides at spaced intervals which serve as latching means for locating the upper seat assembly at a plurality of desired fore and aft positions with respect to the stationary parallel channels and consequently with respect to the vehicle.

The seat base or riser is affixed to front and rear crossmembers which span the space between the parallel channels and interlock with the parallel channels in such a way as to constrain motions other than fore and aft. In addition, the rear crossmember incorporates a retractable pin near each end for latching the crossmember and the seat attached to it to the fore and aft parallel channels. This latching mechanism is designed to carry all lap belt and inertial loads from the seat assembly. The seat upper assembly is additionally affixed on each side to this fore and aft adjuster mechanism by means of a link attached between a lap belt anchor pin on the side of the upper seat assembly and a portion of the latching mechanism incorporated in the rear crossmember of the rail mechanism. In the case of a suspension seat this link may be flexible such as a cable, or belt, or hinged links, but the preferred embodiment is a metal strap with a hole at the upper lap belt attaching end and a slot at the bottom (channel) end. The hole at the upper end of the strap serves as a bushing and engages a shoulder bolt or pin anchoring the lap belt ends to the sides of the seat upper assembly. The lower slotted end engages a shoulder bolt anchored in the aforementioned portion of the latching mechanism so as to accommodate the range of vertical seat motion by sliding upon the lower shoulder bolt. The extremes of the slot are reached at top ride stroke and bottom ride stroke of the suspension assembly. In the case of a static seat involving no vertical movement the slot could be replaced by a round hole. Or more preferably, the lap belt could attach directly to the rear crossmember and the link would not be required.

The advantages of our improved adjuster mechanism are many. They include: Elimination of the need for separate tether belts or links and the resulting need to prevent excessive slack in such links; Simplified installation in vehicles in that tether anchorages and tether belts are not required; Enhancement of operator comfort and convenience in that the lap belt anchor points travel fore and aft and vertically with the operator, making readjustment of the belt unnecessary for any selected fore and aft adjustment position; Elimination of lap belt tugging due to vertical or horizontal seat motion; An ability for the seat to be self supporting for lap belt and inertial loads without the need to overdesign the components of the seat itself, with resultant savings in material, weight, and cost.

BRIEF DESCRIPTION OF THE DRAWINGS

FIG. 1 is a perspective view of our improved adjuster mechanism and seat belt anchorage;

FIG. 2 is a perspective view showing the adjuster mechanism of FIG. 1 with a suspension seat positioned thereon;

FIG. 3 is a front sectional view taken generally on line 3-3 of FIG. 4; and

FIG. 4 is an enlarged fragmentary top view of the rear portion of the adjuster mechanism shown in FIG. 1.

DESCRIPTION OF THE PREFERRED EMBODIMENT

Referring to FIG. 1, the adjustment mechanism and seat belt anchorage is indicated generally at 10. The mechanism includes a pair of parallel channel-shaped guide rails 12 which are held in predetermined relationship relative to one another by a cross over strap member 14 which is affixed to them by welding. Front and rear cross members 16,18 are mounted for fore and aft sliding movement relative to the guide rails 12 by means of front cross member slide portions 20 and rear cross member slide portions 22. A shoulder bolt 26 is carried by rear slide portions 22 and is adapted to engage a slot 28 formed in a rigid link member 30. Seat and occupant loading are transferred to the link 30 at hole 32 and are then transmitted through the link to the bolt 26, the rear slide 22, the guide rails 12 and the floor 62 of the vehicle.

In order to permit a seat 78 mounted on the cross members 16, 18 to be adjusted to various fore and aft positions relative to the guide rails 12 a manually operated actuating lever 36 is provided. The lever 36 is pivoted to the front cross member 16 by a pivot pin 38 and is controlled by a handle portion 40. When it is desired to adjust a seat fore and aft, the handle 40 is moved in a counter clockwise direction until stop member 108 contacts cross member 16. The resulting movement of the rear end of lever 36 will cause pivot plate 42 to pivot clockwise about pivot pin 44 carried by the rear cross member 18. Although the actuating lever 36 is normally biased to the position shown in FIG. 1 by means of spring 46, actuation of the handle 40 will move the pivot plate 42 against the force of spring 46 to cause wire link members 48 to withdraw the retractable square locking pins 52 (FIGS. 3 and 4) from locking engagement with square holes 54 which are formed in the guide rails 12. The guide rails 12 are provided at each of their ends with floor bolt holes 56 and the cross members 16,18 are provided with seat base support holes 58. The holes 56 permit the guide rails 12 to be mounted to the vehicle floor 62 (FIG. 2) by means of floor bolts 64. The seat base 66 of a seat assembly indicated generally at 68 is mounted to the front and rear cross members 16,18 by four seat base bolts 70 which pass through holes 58. As can be seen in FIG. 2, the seat base 66 rigidly ties the front and rear cross members 16,18 together so that when one moves the other will also move. The seat assembly 68 is indicated in dotted lines for clarity and is representative of a common type of suspension seat which can be used with the mechanism 10. The seat assembly 68 includes a seat upper frame 72 which is mounted for movement up and down relative to seat base 66 by means of scissors linkages 74 and a torsion bar 76. A seat member 78 moves with the seat upper frame 72 but can be adjusted in height relative thereto by a height adjustment mechanism 80. Near the rear of the seat upper frame a lap belt support bolt 84 is mounted for supporting the lower end of lap belt 86 which is retained on bolt 84 by a nut 88. Since the support bolt 84 is fixed relative to the seat 78 regardless of any vertical movement of the scissors linkages 74 or the cross members 16,18 it will be obvious that an occupant of seat 78 will feel no discomfort since the tension of lap belt 86 will not change as the seat moves up and down relative to the floor 62. Likewise, the lap belt 86 need not be adjusted when the occupant makes adjustments in the fore and aft position of the seat.

Although the lap belt 86 is anchored to the lap belt support bolt 84, the bolt 84 does not really carry the loading of the occupant or of the seat in the event of a sudden deceleration or impact. Rather, the loading is transmitted through link 30 and lower end of slot 28 to pin 26 and thence to bracket portion 96 which contains a pin retaining hole 97 and is integrally formed with rear cross member slide portion 22. The slide portions 22 each include an integral guide portion 94 which surrounds and supports one of the locking pins 52 and provides a guideway for it as it is moved by one of the wire links 48. Since the slide portions 22 include pin engaging portions 97,94 on opposite sides of the vertical wall of guide rails 12 it is obvious that the pins 52 are supported in one of the adjustment holes 54 in a double shear relationship with the guide rails. This method of retension is very strong and enables all of the seat loading to be transferred to the floor 62 by bolts 64 (omitted from FIG. 3 for clarity).

The operation of the fore and aft adjustment mechanism is readily evident in FIG. 4 where one can see that counterclockwise movement of lever 36 to the dotted line position will cause lever pin 98 carried at the rear of lever 36 to engage the left end of slot 106 in pivot plate 42 so as to move pivot plate 42 to the dotted line position shown when stop member 108 (FIG. 1) contacts cross member 16. Such movement will cause the wire links 48 to withdraw the square locking pins 52 from the holes 97 in bracket 96 and the holes 54 in guide rails 12. The seat occupant can then shift his weight to cause the seat 78 and the cross members 16,18 attached to it to move fore or aft to a desired position at which time the lever 36 can be returned to its solid line position. If the lever 36 is returned when the pins 52 are out of alignment with one of the holes 54 the lever 36 will simply move through the slot 106 from the dotted line to the solid line position shown in FIG. 4 but without causing the plate 42 to rotate from its dotted line position. In this way, the relatively lightweight, but stiff, wires 48 are protected from being bent by force exerted on lever 36. The wires 48 are, however, sufficiently rigid to permit the biasing force of spring 46 to be applied to the inner ends of pins 52 so that when the seat is moved an additional amount forward or backward the pins 52 will be able to spring into the holes 54.

The sliding movement of the slide portions 20,22 on the tops of guide rails 12 is greatly facilitated by plastic bearing pads 102 which are anchored in apertures in the slide portions. The bearing pads 102 not only provide a low friction bearing surface but also serve to scrape off any dirt or other foreign matter that might accumulate on top of the guide rails 12. This feature is particularly advantageous on off the road construction equipment which commonly accumulates heavy coatings of dirt and dust.

We claim as our invention:

1. In a vehicle suspension seat having a seat member movable up and down and fore and aft relative to the floor of a vehicle in which it is mounted, the improvement comprising a pair of guide rail members adapted to be fastened to the floor of a vehicle, a pair of seat member supporting slide rail members interlocked with said pair of guide rail member for fore and aft sliding movement relative thereto, manually operable locking means for locking the ends of at least one of said pair of slide rail members to said pair of guide rail members in a selected position of fore and aft adjustment, lap belt support members fixedly mounted on each side of said seat member for movement therewith, a support member fixedly mounted on each end of said at least one slide rail member and load carrying means mounted between said lap belt support members and said support members which are mounted on said at least one slide rail member, said pair of guide rail members being adapted to receive and transmit to the floor of a vehicle to which said pair of guide rail members is adapted to be affixed, all of the loading of said seat and of an occupant held therein by a lap belt anchored to said lap belt support members, said occupant loading being transmitted to said pair of guide rail members by said load carrying means and by said at least one slide rail member.

2. The vehicle suspension seat of claim 1 wherein said load carrying member comprises a rigid link member which is pivoted at one end to one of said support members, the other end of said rigid link member including a slot which is closed at its outer end, said slot being in guiding engagement with the other of said support members and of such a length so as to permit desired vertical movement of said seat while preventing excess upward or forward seat movement.

3. The vehicle suspension seat of claim 2 wherein said rigid link is pivotally mounted at its upper end to a pin mounted on the seat member which also forms the anchor point for a lap belt.

4. The vehicle suspension seat of claim 1 wherein said manually operable locking means comprise a pair of pins which are resiliently biased into locking engagement with said guide rail members.

5. The vehicle suspension seat of claim 4 wherein said pair of pins are mounted for simultaneous movement out of locking engagement by means of a pivoted lever.

6. The vehicle suspension seat of claim 5 wherein said pivoted lever is actuated by a handle pivoted thereto in a direction to disengage said pair of pins, said handle being incapable of actuating said pivoted lever in a direction to engage said pair of pins.

7. The vehicle suspension seat of claim 6 wherein said pair of pins are attached to said pivoted lever by a pair of straight lengths of wire.

8. The vehicle suspension seat of claim 1 wherein said pair of guide rail members are connected to each other by a strap member, said pair of slide rail members being connected to each other by a portion of said seat member.

9. The vehicle suspension seat of claim 4 wherein said at least one slide rail member includes horizontal portions which underlie and overlie horizontal portions of said guide rail members and side portions straddling the vertical portion of said pair of guide rail members, said pins being engageable with aligned apertures in said side portions and with a selected one of a plurality of apertures in the vertical portion of said guide rail members.

10. The vehicle suspension seat of claim 1 wherein self lubricating bearing pads are mechanically interlocked to one of said pairs of rail members, said bearing pads providing the bearing surface between said pairs of guide rails and slide rails.

* * * * *